United States Patent
Pallas

(10) Patent No.: US 9,648,889 B2
(45) Date of Patent: May 16, 2017

(54) LIQUID-EGG REPLACEMENT COMPOSITION

(71) Applicant: John Pallas, North Olmsted, OH (US)

(72) Inventor: John Pallas, North Olmsted, OH (US)

( * ) Notice: Subject to any disclaimer, the term of this patent is extended or adjusted under 35 U.S.C. 154(b) by 0 days.

(21) Appl. No.: 14/867,345

(22) Filed: Sep. 28, 2015

(65) Prior Publication Data

US 2017/0071222 A1    Mar. 16, 2017

Related U.S. Application Data

(60) Provisional application No. 62/217,403, filed on Sep. 11, 2015.

(51) Int. Cl.

| | | |
|---|---|---|
| A23B 5/025 | (2006.01) | |
| A23B 5/02 | (2006.01) | |
| A23L 1/32 | (2006.01) | |
| A21D 2/26 | (2006.01) | |
| A23B 5/035 | (2006.01) | |
| A23C 9/13 | (2006.01) | |
| A23C 9/123 | (2006.01) | |
| A23C 9/154 | (2006.01) | |
| A23C 19/076 | (2006.01) | |
| A23L 15/00 | (2016.01) | |
| A23C 19/093 | (2006.01) | |
| A23C 21/04 | (2006.01) | |
| A23L 27/60 | (2016.01) | |

(52) U.S. Cl.
CPC ............. *A23B 5/02* (2013.01); *A21D 2/262* (2013.01); *A21D 2/263* (2013.01); *A23B 5/035* (2013.01); *A23C 9/1234* (2013.01); *A23C 9/1315* (2013.01); *A23C 9/1544* (2013.01); *A23C 19/076* (2013.01); *A23C 19/093* (2013.01); *A23C 21/04* (2013.01); *A23L 1/3204* (2013.01); *A23L 15/20* (2016.08); *A23L 15/25* (2016.08); *A23L 27/60* (2016.08); *A23L 27/66* (2016.08); *A23V 2002/00* (2013.01)

(58) Field of Classification Search
CPC ........ A21D 2/262; A21D 2/263; A23B 5/035; A23B 5/02; A23C 9/1234; A23C 9/1315; A23C 9/1544; A23C 19/076; A23C 19/093; A23C 21/04; A23L 15/20; A23L 15/25; A23L 27/60; A23L 27/66; A23L 1/3204; A23V 2002/00
See application file for complete search history.

(56) References Cited

U.S. PATENT DOCUMENTS

| | | | | | |
|---|---|---|---|---|---|
| 2,176,078 | A | * | 10/1939 | Katzman | A23L 15/30 426/568 |
| 2,176,080 | A | * | 10/1939 | Katzman | A23L 15/30 426/564 |
| 2,243,867 | A | * | 6/1941 | Katzman | A23L 15/30 426/568 |
| 3,655,405 | A | * | 4/1972 | Karas | A23P 30/40 426/120 |
| 3,806,608 | A | * | 4/1974 | Perret | A23L 15/35 426/535 |
| 4,882,194 | A | * | 11/1989 | Rapp | A23L 15/20 426/573 |
| 4,963,370 | A | * | 10/1990 | Uchida | A23C 9/1236 426/59 |
| 5,082,684 | A | * | 1/1992 | Fung | A23C 9/1544 426/566 |
| 5,580,630 | A | | 12/1996 | Byrd | |
| 5,584,950 | A | | 12/1996 | Gaffigan | |
| 6,630,231 | B2 | | 10/2003 | Perez et al. | |
| 6,960,394 | B2 | | 11/2005 | Graham et al. | |
| 7,686,903 | B2 | | 3/2010 | Muncaster et al. | |
| 7,882,671 | B2 | | 2/2011 | Bruce et al. | |
| 8,147,644 | B2 | | 4/2012 | Tippins | |
| 8,413,406 | B2 | | 4/2013 | Jablonka et al. | |
| 8,512,838 | B2 | | 8/2013 | Zhang et al. | |
| 8,715,819 | B2 | | 5/2014 | Gencer et al. | |
| 8,793,862 | B2 | | 8/2014 | Weber et al. | |
| 2002/0048628 | A1 | * | 4/2002 | Campbell | A21D 2/262 426/614 |
| 2003/0044507 | A1 | * | 3/2003 | Tobita | A23L 33/11 426/605 |
| 2004/0213885 | A1 | * | 10/2004 | Bisson | A21D 2/262 426/614 |
| 2006/0073211 | A1 | * | 4/2006 | Marenick | A61K 36/15 424/581 |
| 2006/0105055 | A1 | * | 5/2006 | Marenick | A61K 8/345 424/581 |
| 2008/0020641 | A1 | * | 1/2008 | Hiew | H01L 24/97 439/607.01 |
| 2009/0123687 | A1 | | 5/2009 | Chakraborty et al. | |
| 2011/0129575 | A1 | * | 6/2011 | Li | A21D 2/186 426/94 |
| 2011/0159002 | A1 | * | 6/2011 | DuBourdieu | A61K 39/39591 424/157.1 |
| 2012/0313307 | A1 | | 12/2012 | Cartwright et al. | |
| 2013/0247490 | A1 | | 9/2013 | Strait | |
| 2015/0052847 | A1 | | 2/2015 | Wiercinski et al. | |
| 2015/0231863 | A1 | | 8/2015 | Knebel et al. | |

FOREIGN PATENT DOCUMENTS

GB            756643      *   9/1956

OTHER PUBLICATIONS

Structure and Composition of Eggs. 2015. http://www.isapoultry.com/en/support/publications/at-isa-our-business-is-eggs/structure-and-composition/.*

* cited by examiner

*Primary Examiner* — Anthony Weier
(74) *Attorney, Agent, or Firm* — Black, McCuskey, Souers & Arbaugh, LPA

(57) ABSTRACT

A composition having a blend that has 60-80% by weight dried whole egg; 20-40% by weight whey protein concentrate; 1-2% by weight xanthan gum; 0.3-0.7% by weight cream of tartar; and 0.1-0.2% by weight salt.

14 Claims, No Drawings

LIQUID-EGG REPLACEMENT COMPOSITION

CROSS REFERENCE TO RELATED APPLICATIONS

This patent application claims priority to U.S. provisional patent application Ser. No. 62/217,403 filed Sep. 11, 2015. The subject matter of U.S. provisional patent application Ser. No. 62/217,403 is hereby incorporated into this application by reference.

BACKGROUND OF THE INVENTION

There remains a need in the art for liquid-egg replacement compositions.

BRIEF SUMMARY OF THE INVENTION

A composition having a blend that has 60-80% by weight dried whole egg; 20-40% by weight whey protein concentrate; 1-2% by weight xanthan gum; 0.3-0.7% by weight cream of tartar; and 0.1-0.2% by weight salt.

A composition having a blend that has 60-80% by weight dried whole egg; 20-40% by weight whey protein concentrate; and 1-2% by weight xanthan gum.

Logistically, a benefit of the dry-blend component is that during shipping, it takes up less space on a truck compared to liquid egg (because no water is being shipped with the dry-blend component), the dry-blend component is shelf stable for approximately 12 months, and the dry-blend component can be stored in a dry warehouse as opposed to a refrigerator or freezer. Furthermore, for every one truck of the dry-blend component that is shipped, the volume of liquid-egg replacement composition that can be produced with that single truckload of the dry-blend component is approximately equivalent to shipping four trucks of liquid egg. And compared to using liquid egg, the health benefits of using the liquid-egg replacement composition include less cholesterol per serving while maintaining the same amount of protein per serving.

DETAILED DESCRIPTION OF THE INVENTION

Embodiments directed to a liquid-egg replacement composition and related methods are provided. Generally, a dry blend of ingredients is provided to which water is added thereby creating a liquid composition that can be used as a drop-in replacement for liquid egg. Unless otherwise specified, all parts-to-parts ratios described herein are parts by weight.

An embodiment is directed to a dry blend having:
60-80% by weight dried whole egg;
20-40% by weight whey protein concentrate;
1-2% by weight xanthan gum;
0.3-0.7% by weight cream of tartar; and
0.1-0.2% by weight salt.

Another embodiment is directed to a composition having:
2-4 parts by weight water; and
1 part by weight dry blend, wherein the dry blend has the following ingredients:
60-80% by weight dried whole egg;
20-40% by weight whey protein concentrate;
1-2% by weight xanthan gum;
0.3-0.7% by weight cream of tartar; and
0.1-0.2% by weight salt.

Another embodiment is directed to a composition that is:
3 or about 3 parts by weight water; and
1 part by weight dry blend, wherein the dry blend has the following ingredients:
60-80% by weight dried whole egg;
20-40% by weight whey protein concentrate;
1-2% by weight xanthan gum;
0.3-0.7% by weight cream of tartar; and
0.1-0.2% by weight salt.

In embodiments, the dry blend is substantially homogenous and persons of ordinary skill in the art will be able to create a substantially homogeneous blend without having to exercise undue experimentation. Methods for manufacturing a substantially homogenous dry blend are well known.

As a non-limiting example, before being combined with water, the dry-blend component is a dry-powder mixture. After mixing the dry-blend component and water component together in useful amounts, the resultant composition is a liquid-egg replacement composition that may be used as a drop-in replacement for liquid egg.

In an embodiment, the liquid-egg replacement composition is created by adding 2-4 parts by weight of water to 1 part by weight of dry blend and then mixing the parts together. In another embodiment, the liquid-egg replacement composition is created by adding 3 or about 3 parts by weight of water to 1 part by weight of dry blend and then mixing the parts together. In another embodiment, the liquid-egg replacement composition is created by adding 3 parts by weight of water to 1 part by weight of dry blend and then mixing the parts together.

In embodiments, the only egg part(s) in the dry-blend component or liquid-egg replacement composition are those provided by the dried whole egg ingredient within the dry-blend component. Stated differently, in embodiments, the 60-80% by weight dried whole egg is the only egg-based ingredient in either the dry-blend component or liquid-egg replacement composition. This embodiment is in contrast to other embodiments that may include additional egg whites, e.g., dried or liquid-egg whites, being added to the dry-blend component or egg-replacement composition in order to effectively dilute the overall concentration of dried whole egg within either the dry-blend component or liquid-egg replacement composition.

Dried whole egg can be considered to have its normal meaning. As a non-limiting example, whole eggs can generally be understood as having approximately 45 percent protein and approximately 42 percent fat. As an additional non-limiting example, a whole egg can be understood as being all components of the egg except for the shell. Dried whole egg is commercially available.

Whey protein concentrate (WPC) can be understood as having its normal meaning. As a non-limiting example, WPC is a substance produced by removing sufficient non-protein constituents from pasteurized whey so that the finished dry product contains ≥25% protein. WPC is commercially available.

Xanthan gum can be understood as having its normal meaning. As a non-limiting example, xanthan gum is a substance produced by bacterial fermentation or synthetically and used in foods as a gelling agent and thickener. It is a polysaccharide composed of glucose, mannose, and glucuronic acid. Xanthan gum is commercially available. Known substitutes for xanthan gum include: guar, gum, gluten, psyllium fiber, chia seeds, gelatin, agar agar, and ground flax seeds.

Cream of tartar can be understood as having its normal meaning. As a non-limiting example, cream of tartar is a white, crystalline, water-soluble powder, $C_4H_5KO_6$, used chiefly as an ingredient in baking powders and in galvanic tinning of metals. Cream of tartar is commercially available. Known substitutes for cream of tartar include: lemon juice and white vinegar.

Salt can be understood as having its normal meaning. As a non-limiting example, salt is composed primarily of NaCl. Salt is commercially available.

In embodiments, the dry-blend respectively includes known substitutes in place of the listed ingredients, e.g., xanthan gum, cream of tartar, and salt.

Food manufacturing methods are well known, and persons of ordinary skill in the art will be able to manufacture the described embodiments without having to exercise undue experimentation.

The invention claimed is:
1. A composition comprising:
a blend that has:
60-80% by weight dried whole egg;
20-40% by weight whey protein concentrate;
1-2% by weight xanthan gum;
0.3-0.7% by weight cream of tartar; and
0.1-0.2% by weight salt.
2. The composition of claim 1 further comprising:
2-4 parts by weight water; and
1 part by weight blend.
3. The composition of claim 1 further comprising:
about 3 parts by weight water; and
about 1 part by weight blend.
4. The composition of claim 1, wherein the 60-80% by weight dried whole egg is the only egg-based ingredient in the composition.
5. The composition of claim 2, wherein the 60-80% by weight dried whole egg is the only egg-based ingredient in the composition.
6. The composition of claim 3, wherein the 60-80% by weight dried whole egg is the only egg-based ingredient in the composition.
7. A composition comprising:
a blend that has:
60-80% by weight dried whole egg;
20-40% by weight whey protein concentrate; and
1-2% by weight xanthan gum.
8. The composition of claim 7 further comprising:
2-4 parts by weight water; and
1 part by weight blend.
9. The composition of claim 1 further comprising:
about 3 parts by weight water; and
about 1 part by weight blend.
10. The composition of claim 7, wherein the 60-80% by weight dried whole egg is the only egg-based ingredient in the composition.
11. The composition of claim 8, wherein the 60-80% by weight dried whole egg is the only egg-based ingredient in the composition.
12. The composition of claim 9, wherein 60-80% by weight dried whole egg is the only egg-based ingredient in the composition.
13. A composition comprising:
about 3 parts by weight water; and
about 1 part by weight blend, wherein the blend is:
60-80% by weight dried whole egg;
20-40% by weight whey protein concentrate;
1-2% by weight xanthan gum;
0.3-0.7% by weight cream of tartar;
0.1-0.2% by weight salt; and
wherein the 60-80% by weight dried whole egg is the only egg-based ingredient in composition.
14. A product having the composition of claim 1, wherein the product is a dry blend that does not contain water.

* * * * *